United States Patent
Koike et al.

(10) Patent No.: US 9,447,502 B2
(45) Date of Patent: Sep. 20, 2016

(54) CALCIUM PHOSPHATE COMPLEX, AND METHOD FOR PRODUCTION THEREOF

(75) Inventors: Kunihiko Koike, Shiga (JP); Yasumichi Kogai, Tokyo (JP); Masami Nakagawa, Shiga (JP)

(73) Assignees: IWATANI CORPORATION, Osaka (JP); SOFSERA CORPORATION, Tokyo (JP)

( * ) Notice: Subject to any disclaimer, the term of this patent is extended or adjusted under 35 U.S.C. 154(b) by 546 days.

(21) Appl. No.: 13/266,075

(22) PCT Filed: Apr. 30, 2009

(86) PCT No.: PCT/JP2009/058529
§ 371 (c)(1),
(2), (4) Date: Jan. 23, 2012

(87) PCT Pub. No.: WO2010/125686
PCT Pub. Date: Nov. 4, 2010

(65) Prior Publication Data
US 2012/0114832 A1 May 10, 2012

(51) Int. Cl.
*C23C 22/05* (2006.01)
*C09D 1/00* (2006.01)
(Continued)

(52) U.S. Cl.
CPC .................. *C23C 22/05* (2013.01); *C09D 1/00* (2013.01); *C23C 22/83* (2013.01); *C08K 3/32* (2013.01)

(58) Field of Classification Search
CPC ...................................................... C23C 22/05
USPC ............................................. 427/2.25, 388.1
See application file for complete search history.

(56) References Cited

U.S. PATENT DOCUMENTS 6,612,898 B1 * 9/2003 Ohmi ........................ C23C 8/12
148/280
2002/0127262 A1 9/2002 Akashi et al.
(Continued)

FOREIGN PATENT DOCUMENTS

EP   1669477 A1   6/2006
JP   2000-191423 A   7/2000
JP   2000290405 A * 10/2000
(Continued)

OTHER PUBLICATIONS

JP-A-2000-290405 Englsih translation and JP document.*
(Continued)

*Primary Examiner* — Dah-Wei D Yuan
*Assistant Examiner* — Hai Yan Zhang
(74) *Attorney, Agent, or Firm* — Konomi Takeshita

(57) ABSTRACT

Provided is a means for fixing calcium phosphate onto the surface of a metal by a treatment method which uses no acid and produces less residue. A method of producing a calcium phosphate composite in which calcium phosphate is bonded to the surface of a base material, the method including a surface treatment step of bringing the surface of the base material into contact with a surface treating agent, and then into contact with a silane coupling agent, to surface treat the base material; a polymerization step of initiating, after the surface treatment step, polymerization of the silane coupling agent by means of a polymerization initiator; and a bonding step of bonding the silane coupling agent at the surface of the base material after the polymerization step, with calcium phosphate; wherein the base material is a metal, and the surface treating agent is ozone water.

8 Claims, 5 Drawing Sheets

(51) Int. Cl.
  *C23C 22/83* (2006.01)
  *C08K 3/32* (2006.01)

(56) References Cited

U.S. PATENT DOCUMENTS

2005/0119732 A1* 6/2005 Furuzono ............... A61L 27/46
                                                    623/1.49
2009/0306552 A1* 12/2009 Furuzono ............... A61B 90/40
                                                    601/2

FOREIGN PATENT DOCUMENTS

| JP | 2004017410 A | * | 1/2004 |
|----|--------------|---|--------|
| JP | 2004-307887 A | | 4/2004 |
| JP | 2006-089778 A | | 4/2006 |
| JP | 2007-085930 A | | 4/2007 |
| JP | 2007-125548 A | | 5/2007 |
| JP | 2007-125548 A | * | 5/2007 |
| JP | 2007085930 A | * | 5/2007 |

OTHER PUBLICATIONS

JP-A-2004-017410 Englsih translation and JP document.*
JP-A-2007-085930 Englsih translation.*
JP2007125548A English translation.*
Masahiro Okada et al. Preparation of hydroxyapatite-nanocrystal-coated stainless steel,, and its cell interaction, Journal of Biomedical Materials Research Part A, 2008, p. 589-596, Wiley Periodicals, Inc.

* cited by examiner

CALCIUM PHOSPHATE COMPLEX, AND METHOD FOR PRODUCTION THEREOF

FIELD OF THE INVENTION

The present invention relates to a calcium phosphate composite and a method for production thereof, and more particularly, to a calcium phosphate composite in which calcium phosphate is fixed on the surface of a metal, and a method of production thereof.

BACKGROUND OF THE INVENTION

Calcium phosphates such as hydroxyapatite have been widely used in the medical field as biocompatible materials. Particularly, composite materials produced by coating the surface of a base material with calcium phosphate are expected to be applied as percutaneous devices such as catheters because the composite materials have high cellular adhesiveness. For example, there has been suggested a technology of binding fine particles of calcium phosphate to the surface of a flexible polymer base material such as cyclofibroin, and using the composite in a percutaneous device.

Here, as a technique of fixing hydroxyapatite to the surface of a base material, for example, there has been suggested a method of selecting a polymer base material having a particular functional group such as an isocyanate group or an alkoxysilyl group as a polymer base material, and bonding hydroxyapatite to the polymer base material (Japanese Patent Application Laid-Open (JP-A) No. 2004-51952, hereinafter referred to as Patent Document 1). In addition to that, there has been suggested a method of forming hydroxyapatite on the surface of a polymer, the method including a step of immersing a substrate which has at least the surface hydrophilized by a corona discharge treatment, a graft treatment or the like alternately in a calcium solution and a phosphoric acid solution, and producing and fixing hydroxyapatite at least on the surface of the substrate (JP-A No. 2000-327314, hereinafter referred to as Patent Document 2).

Furthermore, as a method of fixing hydroxyapatite on the surface of a metal, there has been disclosed (in OKADA, M., et al., J. Biomed. Mater. Res. Part A, 589-596, 2008, for example, hereinafter referred to as Non-Patent Document 1) a method of treating the surface of stainless steel with nitric acid, subsequently treating the surface of stainless steel with a silane coupling agent (SCA) such as (3-mercaptopropyl) triethoxysilane, graft polymerizing γ-methacryloxypropyltrimethoxysilane (MPTS) to the silane coupling agent that has been introduced to the metal surface by using 2,2-azobis (isobutyronitrile) (AIBN), and fixing hydroxyapatite onto the metal surface by a reaction between the trimethoxysilyl residue of the polymer and hydroxyapatite.

SUMMARY OF THE INVENTION

According to conventional methods, a metal surface must be treated with an acid, so that there have been occasions in which the acid remains and becomes problematic in practical applications. Thus, a first object of the present invention is to provide a means for fixing calcium phosphate to a metal surface by a treatment method which uses no acid and produces less residue.

Furthermore, according to the method of Non-Patent Document 1, in addition to the problem ascribed to the acid treatment described above, there has also been a problem that because a thiol-based silane coupling agent is used, a foul odor characteristic to thiol is generated as a result of the remaining of the silane coupling agent compound. Thus, a second object of the present invention is to further provide, in addition to the task described above, a means for fixing calcium phosphate to a metal surface by a treatment method which does not use a thiol-based compound.

The invention (1) is a method of producing a calcium phosphate composite in which calcium phosphate is bonded to the surface of a base material, the method including a surface treatment step of bringing the surface of the base material into contact with a surface treating agent, and then into contact with a silane coupling agent, to surface treat the base material; a polymerization step of initiating, after the surface treatment step, polymerization of the silane coupling agent by means of a polymerization initiator; and a bonding step of bonding the silane coupling agent at the surface of the base material after the polymerization step, with calcium phosphate; wherein the base material is a metal, and the surface treating agent is ozone water.

The invention (2) is the method according to the invention (1), wherein the silane coupling agent is a non-thiol-based silane coupling agent.

The invention (3) is the method according to the invention (1) or (2), wherein stainless steel is used as the base material.

The invention (4) is a calcium phosphate composite obtainable by the method described in any one of the inventions (1) to (3).

Here, the meanings of various terms used in the present specification will be described. The term "calcium phosphate composite" means a structure in which calcium phosphate is bonded to the surface of a base material. The term "ozone water" means water in which ozone is dissolved. The term "surface treatment" means a treatment for modifying the surface of a base material.

According to the items (1) and (4) of the present invention, since ozone is used instead of an acid when a silane coupling agent is introduced to a metal surface, there is provided an effect that calcium phosphate can be fixed onto a metal surface without any ozone remaining on the metal surface because ozone is decomposed into oxygen as the time passes. Furthermore, when a metal surface is treated with ozone water, a large amount of OH groups are introduced onto the surface of a base material, and wettability is enhanced. Therefore, it becomes remarkably easier to introduce a silane coupling agent as compared with the case of treating with ozone gas, and accordingly, there is provided an effect that calcium phosphate can be fixed onto a metal surface with high adhesive strength and a high coating ratio. Furthermore, since organic materials on the surface of a base material can be removed by the ozone water treatment, an effect that it becomes easy to introduce a silane coupling agent is also provided.

According to the item (2) of the present invention, since a thiol-based compound is not used, there is provided an effect that the problem of foul odor due to the remaining of the thiol-based compound does not occur.

According to the item (3) of the present invention, there is provided an effect that introduction of a silane coupling agent onto a metal surface through an ozone water treatment becomes particularly easier by using stainless steel as a base material.

Other features and advantages of the present invention will become apparent from the following detailed description, taken in conjunction with the accompanying drawings which illustrate, by way of example, the principles of the invention.

BRIEF DESCRIPTION OF THE DRAWINGS

FIG. 3 is a diagram illustrating the results obtained by analyzing the surface of a base material by IR after various processes, while FIG. 3(a) is a diagram illustrating the results for an untreated base material, FIG. 3(b) a diagram illustrating the results for the base material after graft polymerization, and FIG. 3(c) a diagram illustrating the results for the base material after HAp coating;

DETAILED DESCRIPTION OF THE INVENTION

Figure 1A:
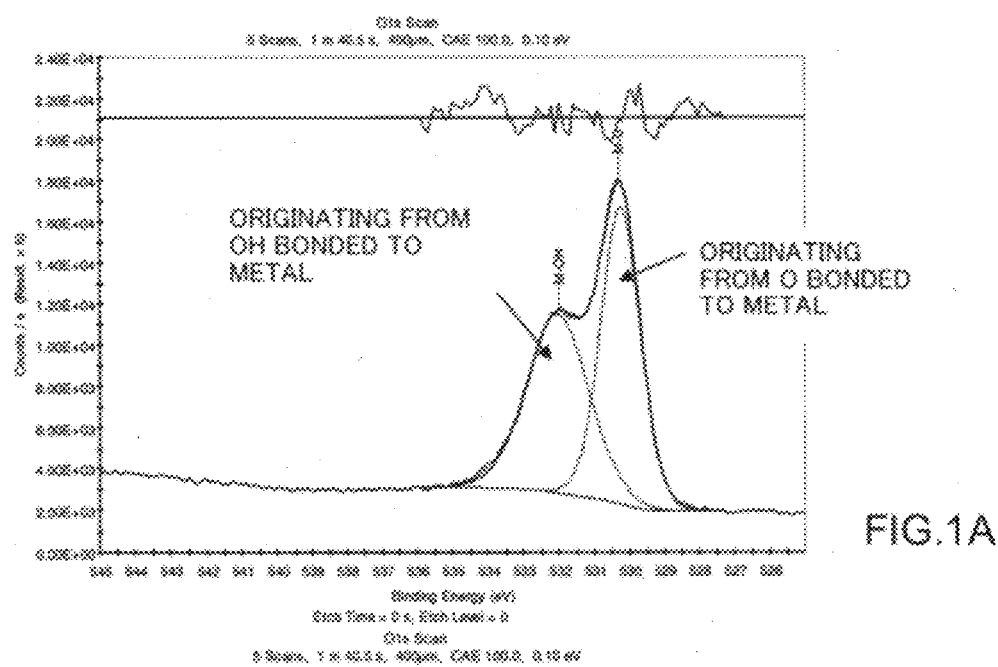
FIG. 1(a) is a diagram illustrating the results obtained by analyzing the surface of a base material by XPS prior to an ozone water treatment.

The calcium phosphate composite according to the most preferred embodiment of the present invention is such that calcium phosphate is bonded to the surface of a base material through a silane coupling agent. The calcium phosphate composite is obtained by a production method which includes a surface treatment step of bringing the surface of the base material into contact with the surface treating agent and then bringing a silane coupling agent into contact to thereby surface treating the base material; polymerization step of initiating the silane coupling agent using a polymerization initiator after the surface treatment step; a bonding step of bonding the silane coupling agent at the surface of the base material after the polymerization step, to calcium phosphate, wherein the base material is a metal, and the surface treating agent is ozone water. Here, the production method may further include, in addition to the steps described above, a pretreatment step of washing the surface of the base material, a homopolymer removal step of removing a homopolymer produced during the polymerization step, a washing step of washing the surface of the base material after the bonding step, or the like. Hereinafter, the principal materials used in the present invention will be described, and then the various steps will be described in detail.

Base Material

The base material used in the present invention is a metal. Here, examples of the metal include titanium, titanium oxide, a titanium alloy, and stainless steel. Among these, stainless steel is particularly suitable. Furthermore, among various types of stainless steel, an austenite-based stainless steel containing molybdenum (Mo) is suitable, and more specifically, SUS316 and SUS317 are suitable. When these stainless steels are used, the ozone water treatment can be efficiently carried out under milder conditions, and the base material and calcium phosphate can be bonded with high adhesive strength and a high coating ratio.

There are no particular limitations on the shape of the base material used in the present invention, and base materials having various shapes can appropriately be selected in accordance with the application of the calcium phosphate composite. The shape of the base material may be a fibrous shape, a sheet shape, a tubular shape, or a porous body, and may be a more complicated shape. As such, the present invention is not restricted by the shape of the base material, and an HAp composite can conveniently be produced using a base material having any complicated shape. In the conventional methods using corona discharge or a plasma treatment, there has been a need to devise the way of carrying out treatments, such as performing corona discharge from various angles, in the case of using a base material having a complicated shape. However, according to the production method related to the present invention, it is sufficient to bring the base material into contact with ozone water as will be described later, and therefore, even a base material having a complicated shape can conveniently be surface-treated. As such, the production method according to the present invention can conveniently achieve bonding of a base material and calcium phosphate with high adhesive strength and a high coating ratio relative to various shapes of the base material.

Silane Coupling Agent

The silane coupling agent that can be used in the most preferred embodiment of the present invention has a chemical structure represented by formula (1).

$$Z\text{—}X\text{—}SiR_3 \tag{1}$$

Z may be any reactive functional group, and specific examples thereof include a vinyl group, an epoxy group, an amino group, a (meth)acryloxy group, and a mercapto group. Furthermore, R may be any group capable of performing a condensation reaction with an inorganic material (hydroxyapatite sintered body), and specific examples thereof include an alkoxy group having 1 to 4 carbon atoms, such as a methoxy group and an ethoxy group, a hydroxyl group, and a chlorine atom. X in the formula (1) may be bonded through a polymer chain, may be bonded through a low molecular weight chain (for example, an alkylene chain having 1 to 12 carbon atoms), or may be directly bonded. Meanwhile, when the alkoxy group has the number of carbon atoms in the range described above, the alcohol produced by the condensation reaction with hydroxyapatite that will be described below has sufficient solubility in water, and accordingly, the alcohol can be removed only by washing the surface with water, which is therefore preferable.

That is, specific examples of the silane coupling agent include vinyl-based silane coupling agents such as vinyltrichlorosilane, vinyltrimethoxysilane, vinyltriethoxysilane and vinyltrihydroxysilane; epoxy-based silane coupling agents such as β-(3,4-epoxycyclohexyl)ethyltrimethoxysilane, γ-glycidoxypropyltrimethoxysilane, γ-glycidoxypropylmethyldiethoxysilane, and γ-glycidoxypropyltriethoxysilane; styryl-based silane coupling agents such as p-styryltrimethoxysilane; methacryloxy-based silane coupling agents such as γ-methacryloxypropylmethyldimethoxysilane, γ-methacryloxypropyltrimethoxysilane, γ-methacryloxypropyltrimethoxysilane, γ-methacryloxypropylmethyldiethoxysilane, γ-methacryloxypropyltriethoxysilane, and γ-methacryloxypropyltrihydroxysilane; acryloxy-based silane coupling agents such as γ-acryloxypropyltrimethoxysilane, and γ-acryloxypropyltrihydroxysilane; amino-based silane coupling agents such as N-β(aminoethyl)γ-aminopropyltrimethoxysilane, N-β(aminoethyl)γ-aminopropylmethyldimethoxymethoxysilane, N-β(aminoethyl)γ-aminopropyltriethoxysilane, γ-aminopropyltrimethoxysilane, γ-aminopropyltriethoxysilane, γ-triethoxy-N-(1,3-dimethylbutylidene)propylamine, N-phenyl-γ-aminopropyltrimethoxysilane, hydrochloride of N-(vinylbenzyl)-β-aminoethyl-γ-aminopropyltrimethoxysilane, and special aminosilanes; ureide-based silane coupling agents such as γ-ureidopropyltriethoxysilane; chloropropyl-based silane coupling agents such as γ-chloropropyltrimethoxysilane; thiol-based silane coupling agents such as γ-mercaptopropyltrimethoxysilane, and γ-mercaptopropylmethyldimethoxysilane; sulfide-based silane coupling agents such as bis(triethoxypropyl)tetrasulfide; and isocyanate-based silane coupling agents such as γ-isocyanatopropyltriethoxysilane.

Among these silane coupling agents, silane coupling agents having polymerizable double bonds, such as vinyl-based silane coupling agents, styryl-based silane coupling agents, methacryloxy-based silane coupling agents, and acryloxy-based silane coupling agents are suitable. Among the silane coupling agents exemplified above, γ-methacryloxypropyltrimethoxysilane and γ-methacryloxypropyltriethoxysilane are more preferred from the viewpoint of being polymerizable monomers. Here, the silane coupling agent according to the present invention may be such that the agent used in the surface treatment step that will be described below is the same as the agent used in the polymerization step, or silane coupling agents of different types may be used. When a thiol-based silane coupling agent having a mercapto group is used, there is a high possibility that a problem of foul odor may occur because the silane coupling agent remains. Therefore, it is preferable to use a non-thiol-based silane coupling agent which does not have a mercapto group.

Calcium Phosphate

There are no particular limitations on the calcium phosphate that is used in the production method according to the present invention, but hydroxyapatite ($Ca10(PO4)6(OH)2$) is preferred, and hydroxyapatite sintered body (also called as hydroxyapatite ceramic) is more preferred. Hydroxyapatite, particularly hydroxyapatite sintered body, can exist in the living body stably for a long time period and is also highly safe, and therefore, hydroxyapatite is excellent as a raw material of calcium phosphate composites used for medical applications. Furthermore, since hydroxyapatite has high adhesiveness to the cells of skin and the like, hydroxyapatite is particularly excellent as a material for percutaneous devices.

Furthermore, there are no particular limitations on the method of producing a hydroxyapatite sintered body, and the hydroxyapatite sintered body may be produced by a conventionally known method. In regard to the method of producing a hydroxyapatite sintered body, and the measurement of the crystallinity of the hydroxyapatite sintered body thus produced, reference may be made to Patent Documents 1 and 2.

<<Surface Treatment Step>>

The surface treatment step included in the production method according to the present invention is a step of surface treating a base material, and may be a step of bringing the surface of the base material into contact with ozone water and then into contact with a silane coupling agent. Furthermore, a pretreatment step of washing the surface of the base material may be carried out before the surface treatment step. Here, the pretreatment step may be carried out depending on the situation, such as in the case where contamination occurs on the surface of the base material. Specifically, the base material may be immersed in a solvent such as water and alcohol, and be subjected to ultrasonic cleaning. Through this step, organic materials on the surface of the base material are removed, and in the surface treatment step that is carried out after this step, the ozone treatment can efficiently be carried out.

The present inventors found that bonding of calcium phosphate and the base material can extremely, conveniently be carried out by an ozone water treatment process of surface treating the base material using ozone water. For example, even if the base material has a complicated shape, ozone water can be brought into contact with the surface of the base material easily and evenly, only by immersing the base material in ozone water or pouring the ozone water onto the base material. Therefore, the operation can be carried out conveniently with high efficiency.

Furthermore, the present inventors also found that when surface treatment is carried out using ozone water, calcium phosphate and the base material can be bonded with high adhesive strength and a high coating ratio. Conventionally, there have been occasions in which when a base material coated with calcium phosphate is subjected to ultrasonic cleaning, calcium phosphate is peeled off. This is ascribed to weak adhesive strength between calcium phosphate and the base material. However, when calcium phosphate is bonded to a base material that has been surface treated with ozone water, peeling of calcium phosphate at the time of ultrasonic cleaning could be suppressed. Furthermore, when a calcium phosphate composite is used for a medical application, it is considered that the coating ratio for the surface of the base material with calcium phosphate is preferably about 60%. According to the production method according to the present invention, a coating ratio with calcium phosphate of 60% or higher can be achieved even for a metal surface. Here, the coating ratio is a value obtained by treating an image taken with a scanning electron microscope with two color tones, and calculating the ratio of the area of the particle areas to the area of the base material surface.

There are no limitations on the ozone water used in the surface treatment step as long as it is water in which ozone is dissolved, and the ozone water can be produced by conventionally known methods and apparatus. For example, ozone water may also be produced by a method of aerating ozone into water. Furthermore, as apparatus for dissolving ozone in water, conventionally known agitators, bubble tubes, pressure injectors, venturi injectors, static mixers and the like may be used. For the method of producing ozone water, reference may be preferably made to Ozone Handbook, edited by Nonprofit Organization Japan Ozone Association, and Fundamentals and Applications of Ozone, written by Sugimitsu, Hidetoshi, Korin Publishing Co., Ltd.

Furthermore, the method of bringing the surface of the base material into contact with ozone water is not particularly limited, but for example, the base material may be immersed in ozone water. Furthermore, the ozone water may also be stirred during immersion. There are no particular limitations on the concentration of ozone in the ozone water used in the production method according to the present invention, but the ozone concentration is preferably 1 to 50 ppm, and more preferably 10 to 35 ppm. When the concentration of ozone water is adjusted to 1 to 50 ppm, calcium phosphate can be bonded to the surface of the base material with very high adhesive strength and a high coating ratio.

Furthermore, when the concentration of ozone water is adjusted to 10 to 35 ppm, calcium phosphate can be bonded to the surface of the base material with even higher adhesive strength and a higher coating ratio. The temperature of the ozone water is not particularly limited, but the temperature is preferably 20° C. to 60° C., more preferably 20° C. to 40° C., and even more preferably room temperature (for example, 25° C.). When the temperature is in this range, calcium phosphate can be bonded to the surface of the base material with very high adhesive strength and a high coating ratio. There are no particular limitations on the time for bringing the surface of the base material into contact with ozone water, but the time is preferably 1 to 120 minutes, more preferably 5 to 30 minutes, and even more preferably 5 to 20 minutes. When the time is in this range, calcium phosphate can be bonded to the surface of the base material with very high adhesive strength and a high coating ratio.

After the surface of the base material is brought into contact with ozone water, and before the surface of the base material is brought into contact with a silane coupling agent, a moisture removal step of immersing the base material in a water-soluble organic solvent and thereby removing the moisture on the surface at the time of the ozone water treatment may be carried out. This step is particularly beneficial when a hydrophobic organic solvent is used for the step of bringing the base material into contact with a silane coupling agent. Specifically, the base material after the ozone treatment is immersed in the organic solvent. Here, there are no particular limitations on the treatment temperature, but for example, the treatment temperature is preferably 10° C. to 50° C., and more preferably 15° C. to 35° C. Furthermore, there are no particular limitations on the treatment time, but for example, the treatment time is preferably 10 seconds to 5 minutes, and more preferably 20 seconds to 1 minute. The solvent used herein is not particularly limited as long as it is a water-soluble organic solvent, and examples thereof include tetrahydrofuran (THF), methanol, ethanol, acetone, acetonitrile, and dimethyl sulfoxide (DMSO), etc.

In the silane coupling agent contact step of bringing a silane coupling agent into contact with the surface of the base material, the silane coupling agent described above is used. There are no particular limitations on the method of bringing the silane coupling agent into contact, but for example, the base material is immersed in a solution in which a silane coupling agent has been dissolved in a solvent. This operation is preferably carried out under a nitrogen atmosphere, and specifically, it is preferable to carry out the operation while injecting nitrogen gas into the solution. Furthermore, there are no particular limitations on the temperature of the solution (reaction temperature), but the temperature is preferably 30° C. to 100° C., and more preferably 40° C. to 80° C. Furthermore, there are no particular limitations on the solvent, but for example, a non-polar organic solvent such as a hydrocarbon-based solvent, such as toluene and hexane is preferably used. There are no particular limitations on the use amount of the silane coupling agent, but the use amount is preferably 10% to 500% by weight, more preferably 50% to 400% by weight, and even more preferably 100% to 300% by weight, relative to the weight of the base material. There are no particular limitations on the contact time with the silane coupling agent, but the contact time is preferably 5 to 120 minutes, and more preferably 10 to 60 minutes.

<<Polymerization Step>>

The polymerization step that is included in the production method according to the present invention may be a step of initiating polymerization of the silane coupling agent by means of a polymerization initiator. In this step, when the polymerization initiator is added, the remainder of the silane coupling agent molecules which do not form bonding on the surface of the base in the surface treatment step described above is polymerized with the silane coupling agent molecules which are bonded to the surface of the base material, and thus a graft polymer is formed. Thereby, a graft polymer having alkoxysilyl groups is formed on the surface of the base material, and therefore, bonding between the alkoxysilyl groups and calcium phosphate is formed in the bonding step that will be described below. Here, in addition to the remainder of the silane coupling agent molecules which do not form bonding to the surface of the base material during the surface treatment step, fresh silane coupling agent molecules may also be added. Furthermore, the silane coupling agent to be added may be the same substance as that used in the surface treatment step, or may be a different substance. Furthermore, it is also acceptable to add a compound having a polymerizable double bond and an isocyanate group, instead of the silane coupling agent. Since a graft polymer having isocyanate groups is formed thereby, urethane bonding between the isocyanate groups and calcium phosphate can also be formed in the bonding step that will be described below.

The polymerization initiator used in this step is selected depending on the type of the silane coupling agent used, but if a silane coupling agent having a polymerizable double bond is used, various known polymerization initiators such as azo-based initiators and peroxide-based initiators can be used. For example, azo-based polymerization initiators represented by azobisisobutyronitrile (AIBN), and peroxide-based polymerization initiators represented by benzoyl peroxide (BPO) may be used.

Furthermore, there are no particular limitations on the temperature of the solution (reaction temperature), but the temperature is preferably 30° C. to 100° C., and more preferably 40° C. to 80° C. Furthermore, there are no particular limitations on the solvent, but for example, a non-polar organic solvent such as a hydrocarbon-based solvent, such as toluene or hexane, is preferably used. There are no particular limitations on the use amount of the silane coupling agent, but the use amount is preferably 10% to 500% by weight, more preferably 50% to 400% by weight, and even more preferably 100% to 300% by weight, relative to the weight of the base material. Furthermore, in the case of using a silane coupling agent, it is more preferable to protect the alkoxysilyl group of the silane coupling agent using a surfactant. There are no particular limitations on the method of protecting the silane coupling agent using a surfactant, but these may be mixed. The amount of the surfactant is preferably 1.0% to 50% by weight, and more preferably 10% to 25% by weight, relative to the silane coupling agent.

After completion of the polymerization, a homopolymer removal step of removing the homopolymer produced in the polymerization step for the silane coupling agent attached on the surface of the base material may be included. Specifically, the base material may be immersed in a solvent such as water or alcohol, and be subjected to ultrasonic cleaning. Through this step, the homopolymer on the surface of the base material is removed, and during the bonding step which is carried out after this step, the alkoxysilyl group of the graft polymer bonded to the base material can react with calcium phosphate, and therefore, it is efficient.

<<Bonding Step>>

The bonding step included in the production method according to the present invention may be a step of bonding calcium phosphate to the surface of the base material after the surface treatment step. There are no particular limitations on the method of bonding calcium phosphate to the surface of the base material after the polymerization step, and conventionally known methods may be used. For example, references may be made to Patent Documents 1 and 2. Specifically, the base material may be immersed in a liquid in which calcium phosphate is suspended. Furthermore, during the immersion, the liquid may be agitated, and an ultrasonic treatment may be carried out. After the immersion, the base material may be left to stand under reduced pressure conditions, preferably under vacuum conditions, and the base material may be further heated under the reduced pressure conditions or the vacuum conditions. The heating temperature is preferably 50° C. to 200° C., and more preferably 80° C. to 150° C.

In the production method according to the present invention, a washing step of washing the calcium phosphate composite obtained by the bonding step may be carried out. The washing step may be carried out according to the use applications of the calcium phosphate composite.

The specific washing method may be appropriately selected in accordance with the intended degree of washing. For example, ultrasonic cleaning may be carried out. Because the calcium phosphate composite obtainable by the production method according to the present invention has very strong adhesive strength between the base material and calcium phosphate, even if the base material is subjected to ultrasonic cleaning, peeling of calcium phosphate can satisfactorily be suppressed. The ultrasonic cleaning may be carried out by any conventionally known method.

The method of producing a calcium phosphate composite as described above can be used for various applications. For example, it is beneficial to apply the method to the manufacturing of medical devices such as a stent.

EXAMPLES

XPS Analysis of Base Material Surface after Ozone Water Treatment

A SUS316L base material having a size of 10 mm×10 mm×thickness of 1 mm was subjected to ultrasonic cleaning (50 W) for 2 minutes in ethanol solvent. Subsequently, the base material was immersed in ozone water at 15 ppm at room temperature for 20 minutes. After immersion, the base material was immersed in THF (tetrahydrofuran), and thereby the moisture on the surface at the time of the ozone water treatment was removed. The ozone water used here was prepared by using a gas dissolving module (manufactured by Japan Gore-Tex, Inc., Model: GT-01T). Specifically, ozone water was prepared by bringing tap water (flow rate: 600 ml/min, pressure: 0.05 MPa) into contact with ozone gas (flow rate: 500 ml/min, pressure 0.03 to 0.05 MPa) in the gas module.

The surface of the base material after the treatment was subjected to an analysis by XPS for the O 1s spectrum of oxygen under the following conditions.

Figure 1B:
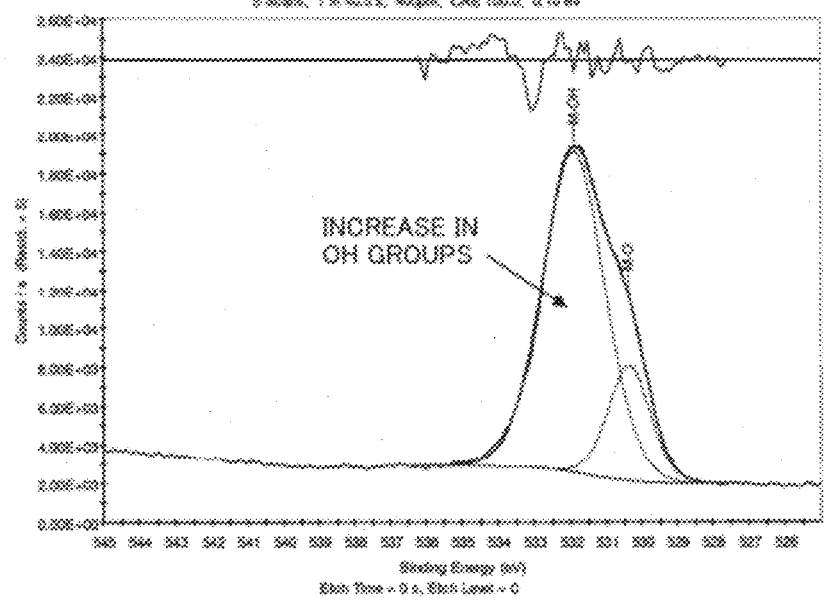
FIG. 1(b) is a diagram illustrating the results obtained by analyzing the surface of a base material by XPS after an ozone water treatment.

Machine type: Theta probe manufactured by Thermo Fischer Scientific, Inc.
Light source: AlKα
Voltage: 15 kV
Current: 6.66 mA
Spot size: 400 μm (Conditions for Narrow Scan)
Pass energy: 100 eV
Number of scans: 5 times
Step: 0.1 eV It could be confirmed that an M (metal)-O bond and an M-OH bond were formed on the surface of an oxide film on the surface of the base material {FIG. 1(b)}. Furthermore, FIG. 1(a) shows the results of analyzing the surface of untreated SUS316L by XPS. According to these results, it was observed that the peak representing the M-OH bond increased. Therefore, it can be seen that many OH groups have been introduced onto the surface of SUS316L.

(Evaluation of Wettability of Surface of Base Material by Ozone Water Treatment)

A SUS316L base material having a size of 10 mm×10 mm×thickness of 1 mm was subjected to ultrasonic cleaning (50 W) for 2 minutes in ethanol solvent. Subsequently, the base material was immersed in ozone water at a predetermined concentration (ppm) at room temperature for a predetermined time (minutes). The ozone water was prepared by the same method as described above. After immersion, the base material was dried, a water droplet was dropped on the surface of the treated base material, and the contact angle between the base material and the water droplet was measured. The results under the respective conditions are shown in the following Table 1. Meanwhile, the contact angle was obtained by dropping 10 μL of water, allowing the water droplet to stand for 30 seconds, measuring the diameter of the spread droplet, and calculating the contact angle from the relationship between the diameter and the amount dropped.

TABLE 1

| Treatment conditions | Contact angle |
| --- | --- |
| Untreated | 69° or greater |
| Ozone water-treated 15 ppm × 20 min. | 44° |
| Ozone water-treated 15 ppm × 60 min. | 26° |
| Ozone water-treated 35 ppm × 60 min. | 31° |
| Ozone gas-treated 7% (residual oxygen) × 30 min. | 47° |
| Nitric acid-treated 35% HNO3, 60° C., 30 min | 48° |

Example 1

Ozone Water Treatment

A SUS316L base material having a size of 10 mm×10 mm×thickness of 0.1 mm was subjected to ultrasonic cleaning (50 W) for 2 minutes in ethanol solvent. Subsequently, the base material was immersed in ozone water at 15 ppm at room temperature for 20 minutes. After immersion, the base material was immersed in THF (tetrahydrofuran), and the moisture on the surface at the time of ozone water treatment was removed.

[Graft Polymerization Treatment]

The base material treated as described above was immersed in a solution containing 3.3 ml of a silane coupling agent (γ-methacryloxypropyltriethoxysilane, manufactured by Shin-Etsu Chemical Co., Ltd., KBE503; hereinafter, simply referred to as "KBE") and 25 ml of toluene at a temperature of 70° C. for 30 minutes, while the solution was bubbled with nitrogen gas. Subsequently, 33 mg of AIBN dissolved in 5 ml of toluene was further added, and while the solution was bubbled with nitrogen gas, the base material was immersed in the solution at a temperature of 70° C. for 120 minutes. Thus, graft polymerization was carried out. As such, it is intended to form a graft polymer between the KBE monomer bonded to the surface of the base material and free KBE in the solvent, by adding AIBN with a time difference. After this treatment, in order to remove the homopolymer of KBE attached onto the surface of the base material, the base material was subjected to ultrasonic cleaning (50 W) at room temperature for 2 minutes in ethanol solvent, and subsequently, the base material was dried under reduced pressure at room temperature for 60 minutes.

[Hydroxyapatite Coating Treatment]

Figure 2A:
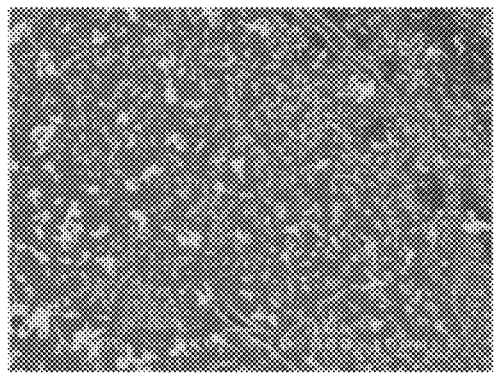
FIG. 2(a) is a SEM photograph of the surface of the composite of Example 1 at a magnification of 10,000 times.
Figure 2B:
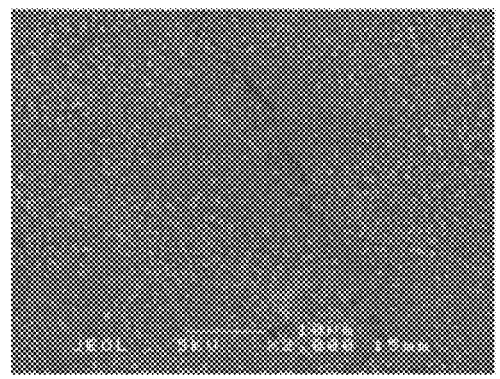
FIG. 2(b) is a SEM photograph of the surface of the composite of Example 1 at a magnification of 2,000 times.
Figure 3:
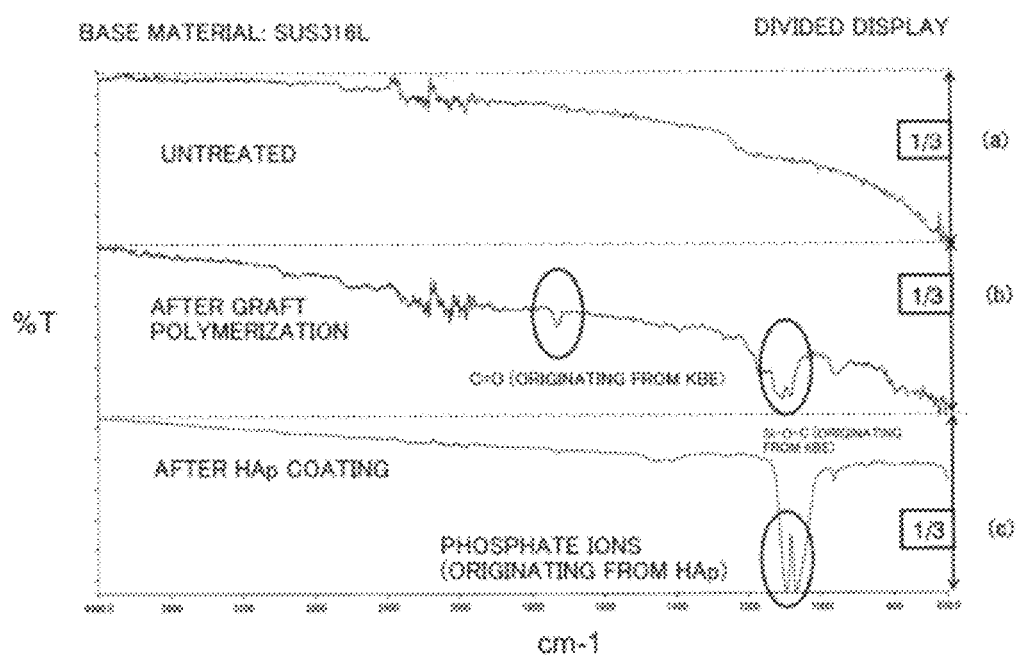

After the treatment described above, the base material was subjected to an ultrasonic treatment (50 W) in a 1% hydroxyapatite (HPa) dispersion liquid (dispersion medium: ethanol) at 35° C. for 20 minutes. Here, as the hydroxyapatite, a hydroxyapatite sintered body produced according to the method described in Patent Document 1 was used. Thereafter, the base material was subjected to annealing (heat treatment) at 110° C. for 120 minutes under reduced pressure. Furthermore, the treated base material was subjected to ultrasonic cleaning (50 W) at room temperature for 2 minutes in ethanol, and the HAp particles which were physically adsorbed onto the surface of the base material were removed. Subsequently, the base material was dried under reduced pressure at room temperature for 60 minutes. A scanning electron microscopic (SEM) photograph obtained by the treatment is shown in FIG. 2. The analysis with a scanning electron microscope was made by using JSM-5510 manufactured by JEOL, Ltd. Furthermore, the results of analyzing by IR on the surfaces of an untreated base material, a base material after a graft polymerization treatment, and a base material after HAp coating are shown in FIG. 3. Here, the analysis by IR was carried out by using Spectrum 100 (Fourier transform infrared spectrometer) manufactured by Perkin Elmer, Inc. According to these results, since a peak representing C=O originating from KBE, or peaks representing Si—O—C originating from KBE were observed after graft polymerization {FIG. 3(b)}, it could be confirmed that KBE had been introduced to the surface of the base material. Furthermore, since peaks representing phosphate ions originating from HAp were observed after the HAp coating {FIG. 3(c)}, it could be confirmed that HAp had been introduced to the surface of the base material.

Example 2

Figure 4A:
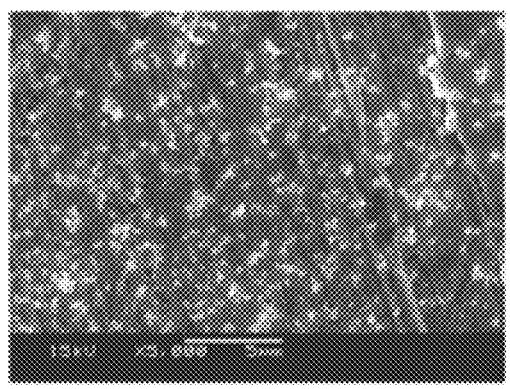
FIG. 4(a) is a SEM photograph of the surface of the composite of Example 2 at a magnification of 5,000 times.
Figure 4B:
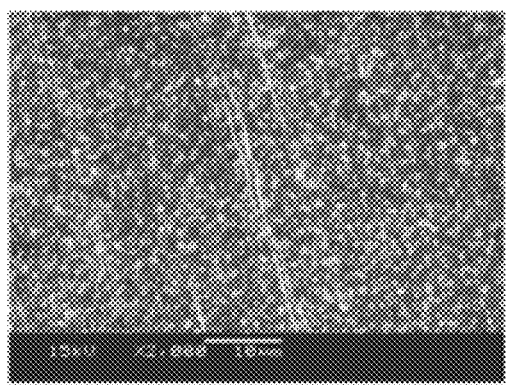
FIG. 4(b) is a SEM photograph of the surface of the composite of Example 2 at a magnification of 2,000 times.

Surface treatment of the base material was carried out under the same conditions as in Example 1, except that SUS304 was used as a base material to be treated, ozone water at 40 ppm was used for the ozone water treatment, and the treatment was carried out for 60 minutes. SEM photographs showing the results of the treatment of the base material are presented in FIG. 4.

Comparative Example 1

Figure 5:
FIG. 5 is a SEM photograph of the surface of the base material of Comparative Example 1 at a magnification of 5,000 times.

Surface treatment of the base material was carried out under the same conditions as in Example 1, except that the graft polymerization treatment was not carried out. A SEM photograph of the surface of the base material is presented in FIG. 5.

Comparative Example 2

Figure 6:
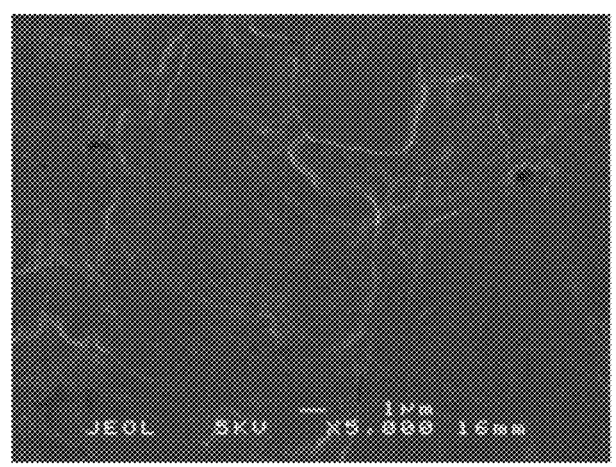
FIG. 6 is a SEM photograph of the surface of the base material of Comparative Example 2 at a magnification of 5,000 times.

Surface treatment of the base material was carried out under the same conditions as in Example 1, except that the ozone water treatment was not carried out. A SEM photograph of the surface of the base material is presented in FIG. 6.

Comparative Example 3

Figure 7:
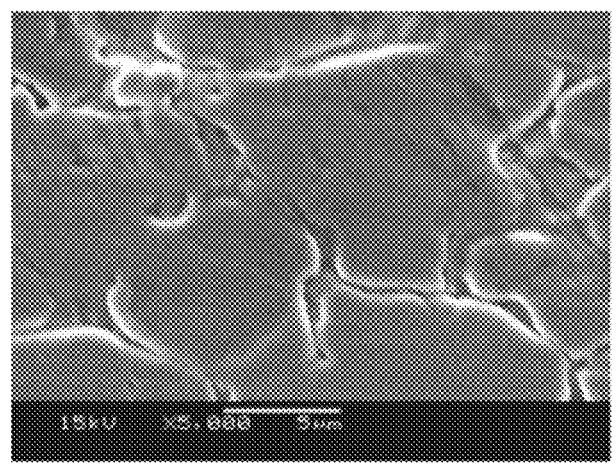
FIG. 7 is a SEM photograph of the surface of the base material of Comparative Example 3 at a magnification of 5,000 times.

Surface treatment of the base material was carried out under the same conditions as in Example 1, except that the ozone water treatment and the graft polymerization treatment were not carried out. A SEM photograph of the surface of the base material is presented in FIG. 7.

From the results of Comparative Examples 1 to 3 above, the surface of the base material failed to be coated with hydroxyapatite when any one of the processes was omitted. Therefore, it can be considered that the ozone treatment and the graft polymerization treatment are both necessary steps.

It is to be understood that the above-described embodiment is illustrative of only one of the many possible specific embodiments which can represent applications of the principles of the invention. Numerous and varied other arrangements can be readily devised by those skilled in the art without departing from the spirit and scope of the invention.

What is claimed is:

1. A method of producing a calcium phosphate composite in which calcium phosphate is bonded to the surface of a base material, the method comprising:
    treating the surface of the base material by contacting with a silane coupling agent after directly contacting the surface with a surface treating agent;
    polymerizing the silane coupling agent by means of a polymerization initiator after the step of treating;
    bonding the silane coupling agent at the surface of the base material after the step of polymerizing, with calcium phosphate;
    wherein the base material is a metal;
    wherein the surface treating agent is ozone water;
    wherein in the step of treating, a concentration of ozone in the ozone water is 10 to 35 ppm, a temperature of the ozone water is 20 to 40° C., and a time for bringing the surface of said base material into direct contact with the ozone water is 5 to 30 minutes;
    wherein after contacting the surface with the surface treating agent and before contacting the surface with the silane coupling agent, the base material is immersed in a water-soluble organic solvent to remove moisture on the surface;
    wherein the silane coupling agent has;
        a functional group selected from the group consisting of a vinyl group, an epoxy group, an amino group, a (meth)acryloxy group and a mercapto group; and
        a functional group selected from the group consisting of an alkoxy group having 1 to 4 carbon atoms, a hydroxyl group, and a chlorine atom;
        wherein the metal is stainless steel; and
        wherein the water-soluble organic solvent is selected from tetrahydrofuran (THF), acetone, acetonitrile and dimethyl sulfoxide (DMSO), and wherein the silane coupling agent is dissolved in a non-polar organic solvent.

2. The method according to claim 1, wherein said metal is stainless steel;
    the silane coupling agent is a non-thiol-based silane coupling agent; and
    said polymerization initiator is an azo-based initiator or a peroxide-based initiator.

3. The method according to claim 1, wherein said metal is stainless steel;

the silane coupling agent is a non-thiol-based silane coupling agent;
said polymerization initiator is an azo-based initiator or a peroxide-based initiator; and
said calcium phosphate is hydroxyapatite or hydroxyapatite sintered body.

4. The method according to claim 1, wherein said metal is stainless steel;
the silane coupling agent is a non-thiol-based silane coupling agent;
said polymerization initiator is an azo-based initiator or a peroxide-based initiator; said calcium phosphate is hydroxyapatite or hydroxyapatite sintered body;
in the step of treating, a use amount of the silane coupling agent relative to the weight of the base material is 10% to 500% by weight, a reaction temperature is 30° C. to 100° C., and a contact time with the silane coupling agent is 5 to 120 minutes; and
said polymerizing step uses a surfactant, and an amount of the surfactant, relative to the silane coupling agent, is 1.0% to 50% by weight, and a reaction temperature is 30° C. to 100° C.

5. A method of producing a calcium phosphate composite in which calcium phosphate is bonded to the surface of a base material, the method comprising:
treating the surface of the base material by contacting with a silane coupling agent after directly contacting the surface with a surface treating agent;
polymerizing the silane coupling agent by means of a polymerization initiator after the step of treating;
bonding the silane coupling agent at the surface of the base material after the step of polymerizing, with calcium phosphate;
wherein the base material is a metal;
the surface treating agent is ozone water;
wherein in the step of treating, a concentration of ozone in the ozone water is 10 to 35 ppm, a temperature of the ozone water is 20 to 40° C., and a time for bringing the surface of said base material into direct contact with the ozone water is 5 to 30 minutes;
wherein after contacting the surface with the surface treating agent and before contacting the surface with the silane coupling agent, the base material is immersed in a water-soluble organic solvent to remove moisture on the surface;
wherein the water-soluble organic solvent is selected from tetrahydrofuran (THF), acetone, acetonitrile and dimethyl sulfoxide (DMSO);
wherein the silane coupling agent is dissolved in a non-polar organic solvent; and
wherein the metal is stainless steel.

6. The method according to claim 5, wherein said metal is stainless steel;
the silane coupling agent is a non-thiol-based silane coupling agent; and
said polymerization initiator is an azo-based initiator or a peroxide-based initiator.

7. The method according to claim 5, wherein said metal is stainless steel;
the silane coupling agent is a non-thiol-based silane coupling agent;
said polymerization initiator is an azo-based initiator or a peroxide-based initiator; and
said calcium phosphate is hydroxyapatite or hydroxyapatite sintered body.

8. The method according to claim 5, wherein said metal is stainless steel;
the silane coupling agent is a non-thiol-based silane coupling agent;
said polymerization initiator is an azo-based initiator or a peroxide-based initiator; said calcium phosphate is hydroxyapatite or hydroxyapatite sintered body;
in the step of treating, a use amount of the silane coupling agent relative to the weight of the base material is 10% to 500% by weight, a reaction temperature is 30° C. to 100° C., and a contact time with the silane coupling agent is 5 to 120 minutes; and
said polymerizing step uses a surfactant, and an amount of the surfactant, relative to the silane coupling agent, is 1.0% to 50% by weight, and a reaction temperature is 30° C. to 100° C.

* * * * *